Aug. 5, 1958  J. G. JACKSON  2,845,840
INTERMITTENT MOVING APPARATUS FOR PICTURE PROJECTORS
Filed April 6, 1954  3 Sheets-Sheet 1
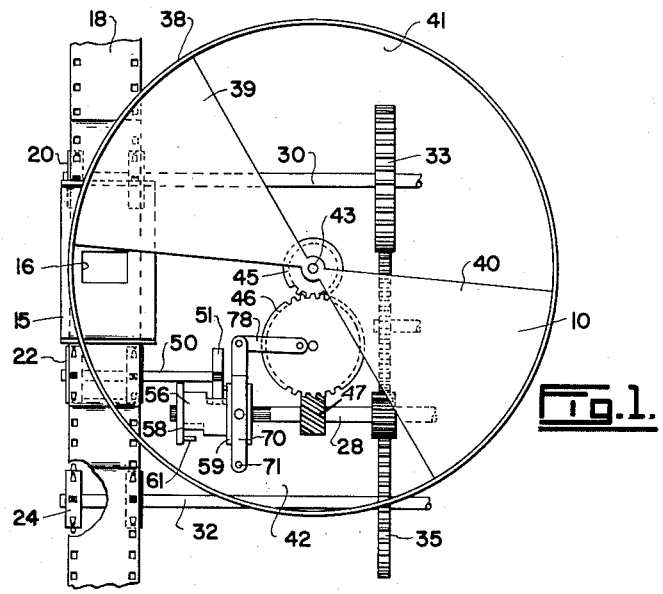
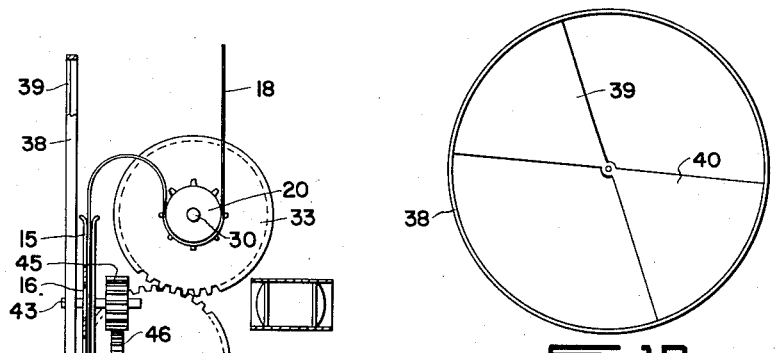
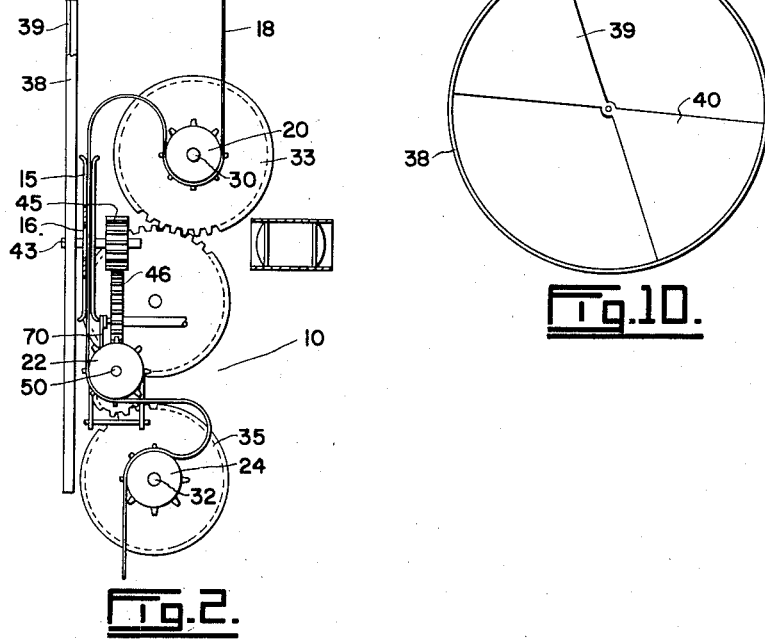
INVENTOR
JAMES GORDON JACKSON
BY
Fetherstonhaugh & Co.
ATTORNEYS

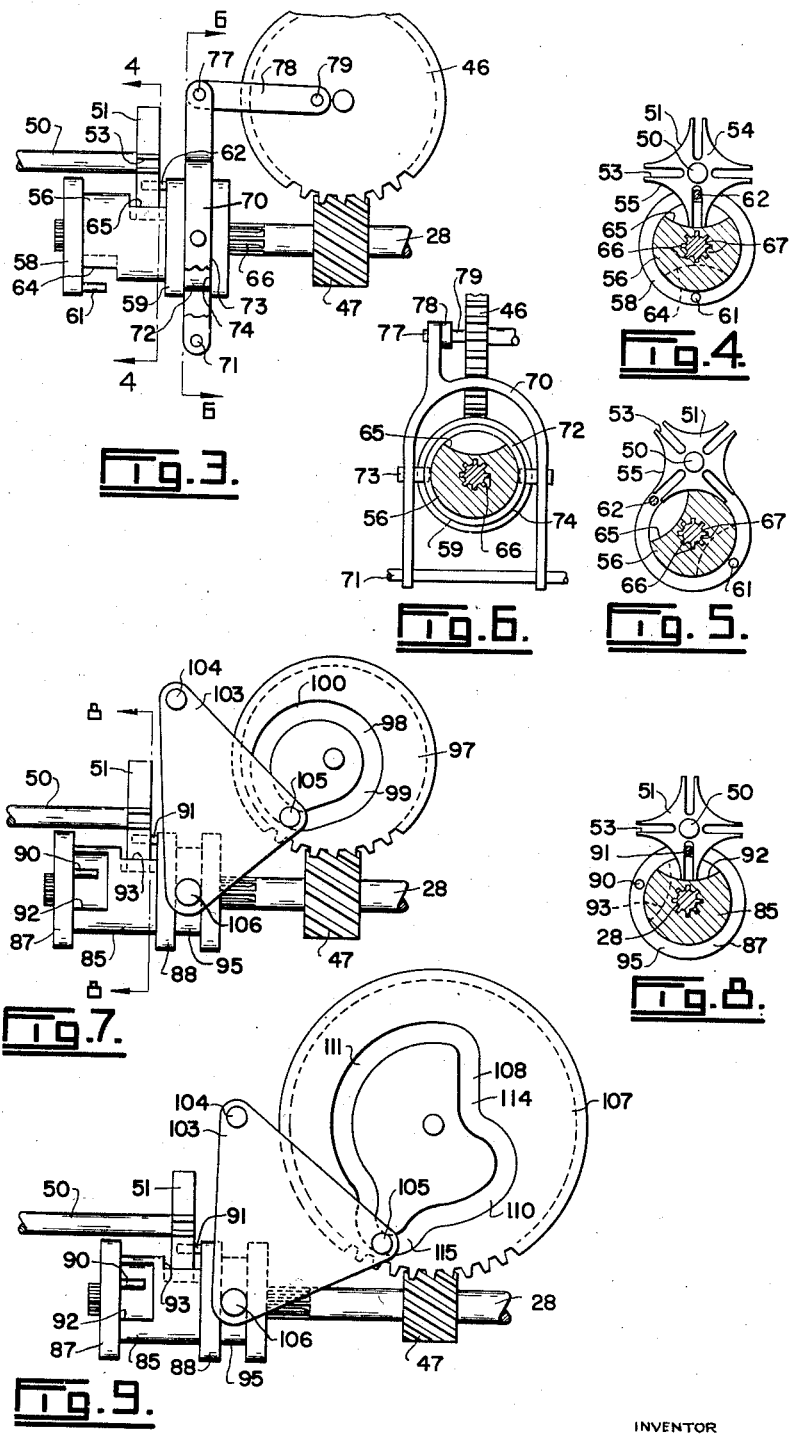

Aug. 5, 1958 J. G. JACKSON 2,845,840
INTERMITTENT MOVING APPARATUS FOR PICTURE PROJECTORS
Filed April 6, 1954 3 Sheets-Sheet 3
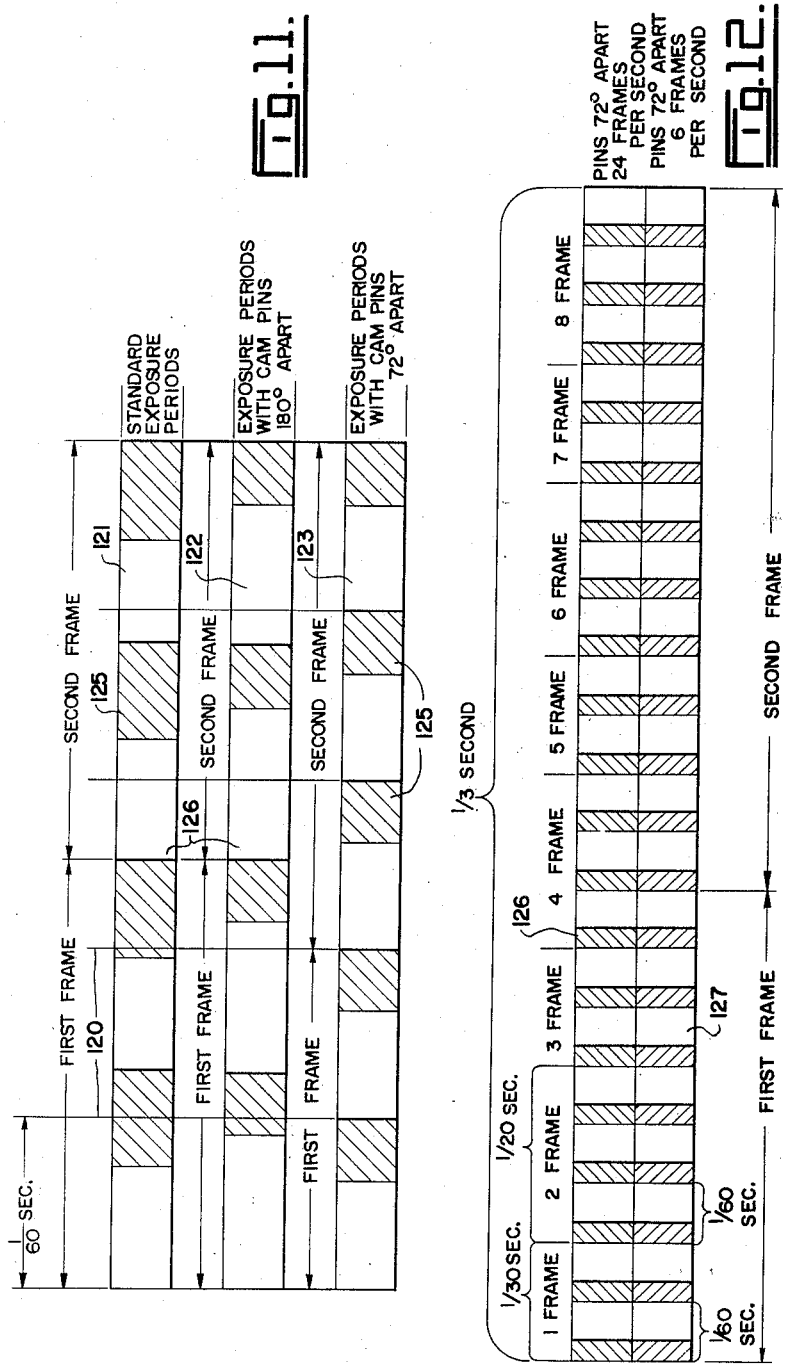
INVENTOR
JAMES GORDON JACKSON
BY
Fetherstonhaugh & Co.
ATTORNEYS

United States Patent Office 2,845,840
Patented Aug. 5, 1958

2,845,840
INTERMITTENT MOVING APPARATUS FOR PICTURE PROJECTORS

James Gordon Jackson, Port Alberni, British Columbia, Canada

Application April 6, 1954, Serial No. 421,286

4 Claims. (Cl. 88—18.3)

This invention relates to improvements in moving picture projectors, and particularly to the intermittent moving and shutter apparatus thereof.

An object of the present invention is the provision of apparatus for intermittently moving film through a picture projector which causes more light to be projected in a given time than is customary without changing the normal number of frames moved per second, namely, 24 frames per second.

Another object is the provision of apparatus in a moving picture projector for producing a projection frequency timed to coincide with that of television, that is, 60 exposures per second, without changing the normal number of frames moved per second.

A further object is the provision of means for intermittently moving a normal film through a picture projector at reduced speed to produce slow motion without reducing the ordinary speed of either the main driving shaft of the projector or the shutter thereof.

Yet another object is the provision of means for intermittently moving a normal film through a picture projector in such a way as to produce slow motion and yet having a projection frequency timed to coincide with that of television.

The amount of light projected on to a screen in a given time is increased without changing the normal number of frames moved per second by moving the film faster during the non-exposure period and allowing it to remain longer in the exposure period. This may be accomplished one way according to the present invention by movably mounting a cam on the driving shaft of the projector having two opposed pins adapted alternately to enter the radial slots of a star wheel mounted on a driven shaft upon which the film driving sprocket is fixedly mounted. Suitable means is provided for reciprocating the cam on the shaft. The driving shaft is rotated at a higher speed than is customary so that the sprocket is turned faster than usual when the star wheel is rotated by the pins. The pins are positioned circumferentially relative to each other and the speed of reciprocation of the cam is such that the latter makes one and a half turns for each movement of the star wheel. A satisfactory arrangement is to rotate the driving shaft at 2160 R. P. M., setting the cam pins 180° apart, and using a gear driven by the shaft at 720 R. P. M. with means operated thereby to reciprocate the cam back and forth once during each revolution of said gear. The shutter of the projector is designed and rotated at such speed that there are two cut-offs or non-exposure periods each time a frame is at rest. For example, the shutter may have two 54° blades, and rotate at 1440 R. P. M.

Another way in accordance with this invention of increasing the amount of light projected on to a screen in a given time and, at the same time, increasing the projection frequency to coincide with that of television, without changing the normal number of film frames moved per second, is to use the cam and pin arrangement described above with increased driving shaft speed, and positioning the pins circumferentially relative to each other and reciprocating the cam so that every second frame remains stationary a little longer than the alternate frames. With this arrangement, the shutter is designed and its speed is such relative to the stationary periods of the frames that there are two exposures during each shorter stationary period and three exposures during each longer period. The following is an example of this arrangement: driving shaft speed 2160 R. P. M., cam pins 72° apart, speed of reciprocating gear 720 R. P. M., and the cam moved in one direction during two-fifths of a revolution of the gear, and moved in the opposite direction during the remainder of said revolution, that is, during three-fifths of the revolution. In this case, the shutter may have two 66° blades, and rotate at 1800 R. P. M.

With the increased frequency arrangement, every second film frame is exposed in the ratio of 2 to 3 to the alternate frames. All the exposure periods are the same length, while all the non-exposure periods are of the same length relative to each other. Each of the latter periods is shorter than an exposure period. This idea may be utilized to produce slow motion without altering the speed of the main driving shaft or the shutter. This is accomplished by reducing the speed of reciprocation of the cam. For example, the speeds of the reciprocating gear may be reduced to 180 R. P. M. If the shutter was arranged to produce two cut-offs or non-exposures and two exposures during the shorter period and three cut-offs or non-exposures and three exposures during the longer period, this slowing up of the cam reciprocation will result in eight alternate cut-offs and exposures during the shorter period and twelve alternate cut-offs and exposures during the longer period.

Examples of this invention are illustrated in the accompanying drawings, in which:

Figure 1 is a diagrammatic front elevation of a projector with the improved intermittent moving apparatus therein, Figure 2 is a diagrammatic side elevation of the apparatus shown in Figure 1, Figure 3 is an enlarged elevation of one form of intermittent moving apparatus, Figure 4 is a vertical section taken on the line 4—4 of Figure 3 with the star wheel part way through a movement thereof, Figure 5 is a view similar to Figure 4 with the star wheel in an at-rest position, Figure 6 is a section taken on the line 6—6 of Figure 3, Figure 7 is a view similar to Figure 3 showing an alternative form of intermittent moving apparatus, Figure 8 is a section taken on the line 8—8 of Figure 7, Figure 9 is a view illustrating a variation of the form of the invention shown in Figure 7, Figure 10 is an elevation of a shutter which may be used with either of the alternatives of Figure 7 or 9, Figure 11 is a chart comparing the exposure and non-exposure periods of two forms of this invention with those of standard projectors, and Figure 12 is a chart comparing the exposure and non-exposure periods of one of said forms of the invention with a variation thereof.

Referring particularly to Figures 1 and 2 of the drawings, 10 generally designates a moving picture projector, said projector being diagrammatically illustrated and including only the elements necessary for the present invention. A film gate 15 of any well-known construction has an aperture 16 therein which is located in a beam of light from a source, not shown. As is usual, this aperture is the size of a film frame. A picture film 18 from an upper reel, not shown, extends around an upper feed sprocket 20, down through the film gate 15 and past the aperture therein, around an intermittent feed sprocket 22, and a lower feed sprocket 24. A main driving shaft 28 is mounted in the machine and rotated by a suitable source of power, not shown. The upper and lower sprockets 20 and 24 are driven at a constant speed by the driving shaft 28 and are connected thereto in any convenient manner. In this example, sprockets 20 and 24 have shafts 30 and 32 projecting outwardly therefrom which are connected respectively by gear drives 33 and 35 to the driving shaft.

A relatively large shutter 38 is provided, said shutter preferably having diametrically opposed blades 39 and 40 separated by large openings 41 and 42. This shutter is mounted on a shaft 43 which is so located that the shutter overlaps aperture 16 near the periphery of the former, see Figure 1. When the shutter rotates, its blades intermittently cut off the light from passing through the aperture. A pinion 45 mounted on shaft 43 meshes with a drive gear 46 which, in turn, meshes with a spiral gear 47 mounted on the driving shaft 28. The apparatus described so far is common in moving picture projectors.

This invention is concerned with mechanism for intermittently rotating the sprocket 22. This sprocket is mounted on and rotates with a driven shaft 50 having a star wheel 51 of well known design fixedly mounted thereon. This star wheel is clearly shown in Figures 4 and 5, and has four radiating slots 53 arranged at right angles to each other. These slots are separated by webs 54 having curved outer surfaces 55 which are adapted slidably to fit against the peripheral surface of a drum-shaped cam 56 as is well known in the art. The cam has flanges 58 and 59 at its opposite ends. A pin 61 projects inwardly from flange 58, and another pin 62 projects inwardly from flange 59. These pins may be arranged anywhere from in line with each other to positions spaced 180° apart. In the form of the invention illustrated in Figures 3 to 5, the pins are spaced apart circumferentially 180°. Notches 64 and 65 are formed in the periphery of the cam at the pins 61 and 62 respectively.

The periphery of the cam 56 normally slidably bears against a curved surface 55 of the star wheel, as shown in Figure 5, at which time the wheel remains stationary. When a pin 61 or 62 enters a slot 53 of the wheel, the latter turns with the drum until the pin moves out of the slot again, but at this time the portions of the webs 54 on each side of the slot in question extend into the recess 64 or 65 of the pin, as clearly shown in Figure 4. With the arrangement shown, the star wheel makes a quarter turn each time a pin enters one side of its slots, and the film 18 is moved one frame during each movement of the wheel.

Cam 56 is slidably mounted on the driving shaft 28 in such a way as to rotate with it. The shaft may be provided with splines 66 into which keys 67 formed on the cam slidably fit, see Figures 4 and 5. The free ends of the pins 61 and 62 are spaced apart longitudinally of the cam. This enables the cam to be shifted at such a speed that it makes one and a half revolutions between each rotation of the star wheel. In other words, when the cam starts to shift to withdraw one pin from the path of the star wheel, the other pin misses said wheel once before engaging it.

The cam 56 may be reciprocated on the driving shaft in any desired manner. In the example of the invention illustrated in Figures 1 to 5, an inverted yoke 70 is pivotally mounted at its lower end on a shaft 71, said yoke straddling the cam and having a ring 72 pivotally connected by pins 73 and riding in a groove 74 formed in the cam, see Figure 6. The upper end of the yoke is pivotally connected at 77 to a link 78, the opposite end of which is connected to the gear 46 by pin 79, said pin being spaced outwardly from the axis of rotation of the gear. With this arrangement, the cam is reciprocated back and forth once during each revolution of gear 46.

The apparatus described so far operates as follows:
Driving shaft 28 rotates at a constant speed and turns the upper and lower sprockets 20 and 24 through the gear connections 33 and 35. These sprockets rotate at a constant speed which is relatively low compared to the speed at the driving shaft, and they take care of the slack in the film 18, but do not actually move it through the film gate 15. This is done intermittently by sprocket 22.

Gear 46 is timed to reciprocate the cam back and forth once during every three revolutions of the driving shaft. Figure 3 shows pin 62 of the cam engaging and rotating star wheel 51. The cam makes one and a half revolutions before pin 61 arrives at a position corresponding to that of pin 62 in this figure. In other words, the star wheel is rotated through 90° during every one and a half revolutions of the driving shaft. Sprocket 22 turns with the star wheel and it moves the film 18 downwardly each time to move another frame thereof into line with aperture 16. Thus, the speed and timing of the intermittent movements of the film depends upon the speed of the driving shaft, the position of pins 61 and 62 relative to each other on the cam, and the rate of reciprocation of the latter.

In the moving picture projectors now in common use in theatres, the film is moved at a rate of 24 frames per second, and it is desirable that this mechanism move the film at the same rate. The driving shafts in the standard projectors turn at 1440 R. P. M. or 24 R. P. S. With the arrangement described above and by rotating the drive shaft at a higher speed, each movement of the film is faster than in the standard projectors, and as the film generally is moving at the same rate of speed, this results in a longer exposure time of each frame at the aperture. The shutter 38 is rotated at such a speed and its blades 39 and 40 are of such size that the light through each frame and the aperture is cut off twice during each stationary period of the film.

In standard projectors, the film moves while the cam which turns the star wheel rotates through 90°. As the cam makes one revolution for each movement of the star wheel, the film remains stationary during a turn of 270° of the cam. At 24 R. P. S., the cam turns 90° in 1/96 second, and 270° in 3/96 second. Thus, the ratio of the stationary period of the film to the moving period thereof is three to one.

The following sets out desirable speeds for use with this invention, but it is to be understood that these speeds are not the only ones that may be used. The driving shaft may be turned at 2160 R. P. M. or 36 R. P. S. Gear 46 may be rotated at 720 R. P. M. With this arrangement, cam 56 makes three revolutions to every revolution of the gear so that the cam rotates one and a half times while the gear makes a half revolution. The film moves while the cam rotates 90° and is stationary while it rotates 450°. At 36 R. P. S., the cam turns 90° in 1/144 of a second, and 450° in 5/144 of a second. With this arrangement, the ratio of the stationary period of the film to the moving period thereof is five to one.

As there are two non-exposure periods during each stationary period of the film in both the standard and the present projectors, the latter directs considerably more light on to the screen during each stationary period of the film when a frame is located in the aperture. With the shutter 38 rotating at 1440 R. P. M., the blades 39 and 40 should each be 54° wide and the openings 41 and 42 should be 126° wide each in order to produce the desired results.

The form of the invention illustrated in Figures 7 and 8 includes a slightly different cam from the one illustrated in Figures 3 to 5, and a different way of reciprocating said cam. The cam 85 is substituted for cam 56 on the driving shaft 28. Cam 85 is slidably mounted on and rotates with the shaft. It has spaced flanges 87 and 88 with pins 90 and 91 projecting inwardly therefrom. These pins are spaced apart circumferentially 72°. The inner ends of these pins are also spaced apart longitudinally of the cam a distance greater than the thickness of the star wheel 51, as clearly shown in Figure 7. Recesses 92 and 93 are formed in the surface of the cam beneath the pins 90 and 91 respectively. The cam also has an annular groove 95 at one end thereof.

Cam 85 may be reciprocated on the driving shaft in any convenient manner. As it is desirable to move the cam in one direction at a certain speed and in the opposite direction at a different speed, it has been found that some sort of cam arrangement is best for reciprocating it. For this purpose, a gear 97 is substituted for gear 46, and meshes with the spiral gear 47. Gear 97 is provided on one face with a cam track 98 which is somewhat oval in design. This track has a short section 99 extending in one direction, and a longer section 100 extending in the opposite direction. A rocker arm 103 pivotally mounted at 104 has a pin 105 projecting into this cam track, and another pin 106 projecting into the groove 95 of cam 85.

As the pin 105 in the cam track 98 moves towards the section 99 thereof, pin 90 is moved into the path of the star wheel 51. The pin remains in this path while pin 105 moves through the track section 99. As the latter pin moves towards track section 100, the cam is moved to bring pin 91 into line with the star wheel, and it stays in this line while pin 105 moves through most of the track section 100. As the inner ends of the pins 90 and 91 are spaced apart longitudinally of the cam, the latter may make any desired number of revolutions while the star wheel is at the centre thereof and out of line with either of its pins.

The cam track 98 is so shaped that cam 85 is moved in one direction while gear 97 makes 2/5 of a revolution or rotates through 144°, and the cam is moved in the opposite direction while said gear makes 3/5 of a revolution or rotates through 216°. With driving shaft 28 rotating at 2160 R. P. M. and gear 97 at 720 R. P. M., the latter makes 2/5 of a revolution in 1/30 of a second, and 3/5 of a revolution in 1/20 of a second. Therefore, every two frames take 1/12 of a second. Thus, the film 18 moves through the machine at the rate of 24 frames per second.

Shutter 38 is rotated at such a speed and its blades 39 and 40 are of such size that there are two non-exposure periods while every second frame is in the aperture, and three non-exposure periods when each alternate frame is in the aperture. There are, therefore, five non-exposure periods and five exposure periods for every two frames, and this results in sixty exposures per second as contrasted with the usual forty-eight exposures per second with standard equipment. This results in considerably more light being thrown on the screen in a given period, and it times the exposures at sixty per second which coincides with that required for television.

Figure 9 illustrates a variation in the form of the invention shown in Figure 7, which makes it possible to show ordinary film at slow motion rate. A gear 107 replaces gear 97, and has a cam track 108 of special design for receiving pin 105. This gear is of such size that it rotates at a much lower speed than drive shaft 28 such as, for example, 1 to 12. If the driving shaft turns at 2160 R. P. M., this gear will rotate at 180 R. P. M. The cam track 108 has short and long curved neutral portions 110 and 111 arranged on opposite sides of the axis of gear 107, these curved portions having a common centre which coincides with said axis. The track also has an inward portion 114 extending between ends of the portions 110 and 111 and curving inwardly towards the gear axis, and an outward portion 115 opposite said inward portion and curving outwardly from the axis. When pin 105 is travelling through either of the neutral portions 110 or 111, cam 85 is so positioned that the star wheel is not touched by either of the pins thereof. As the pin rides through track portions 114 and 115, the cam is moved to bring pins 90 and 91, respectively, into engagement with the wheel. Gear 109 makes 2/5 of a revolution while pin 105 moves from the centre of the inward portion through portion 110 to the centre of the outward portion, and it makes 3/5 of a revolution while moving from the latter point through portion 111 back to the centre of the inward portion. With this arrangement, every second frame of the film remains in the aperture 16 during 2/5 of a revolution of gear 105, and each alternate frame remains in the aperture during 3/5 of a revolution of said gear.

With the driving shaft turning at 2160 R. P. M., the film 18 moves through the projector at one-quarter standard film speed, that is, six frames per second. This provides the slow motion projection. However, the shutter 38 rotates at the same speed as it did in the form of the invention of Figure 7. This results in eight exposures for every second frame in the aperture, and twelve exposures for each alternate frame in the aperture. As the film is travelling at the rate of six frames per second, every two frames take 1/3 of a second and, therefore, there are sixty exposures per second. This coincides with the number of exposures required for television.

Figures 10 illustrates a shutter 38 which may be used with either of the forms of the invention illustrated in Figures 7 or 9. The blades 39 and 30 are each 66° wide, and when the latter is rotated at 1800 R. P. M., it will provide the required number of shut-offs or non-exposure periods per second.

This same idea of obtaining slow motion pictures may be used with the cam pins 180° apart, or with a cam speed of 1440 R. P. M. and the cam pins 72° or 180° apart. In each case, the cam track of gear 107 has to be designed to retain the cam with its pins clear of the star wheel for periods sufficient to produce the required film speed. As the shutter speed is not affected, the exposure and non-exposure periods are not changed. With the slower cam speed, the shutter blades have to be a little wider than with the speed of 2160 R. P. M.

Figure 11 digrammatically compares the exposure periods of a standard projector, a projector according to the present invention with the pins 180° apart, and another projector incorporating this invention with the pins 72° apart. Lines 120 indicate periods of time 1/60 of a second long. There are bands 121, 122 and 123 representing the three projectors being compared. The shaded portions 125 represent the non-exposure periods, while the unshaded portions 126 represent the exposure periods. In band 121 there are four exposure periods in 1/12 second. Band 122 has the same number of exposure periods in this time, but they are considerably longer than those of band 121. In other words, more light is projected on to the screen with the 180° pin arrangement of this invention than with the standard projectors. In band 123 there are five exposure periods in 1/12 of a second. Here again, the exposure periods in the illustrated period are longer than those of the standard projector in the same period, and the timing coincides with that required for television.

Figure 12 illustrates bands 126 and 127, the first representing the exposure periods with the film moving at 24 frames per second, and the second with the film moving at 6 frames per second. As the shutter is rotating at the same speed in both cases, the number of exposures is the same in a given time in each case. In band 126 every second frame has two exposures, and each alternate frame three exposures, and eight frames move every one-third second. In band 127, two frames move in one-third second, and one frame has eight exposures and the other twelve exposures in this time. Thus, in both bands there are 60 exposures per second although the films are moving at different speeds.

What I claim as my invention is:

1. In a moving picture projector, a driving shaft mounted for continuous rotation, a driven shaft near and parallel with the driving shaft for intermittent rotation, a film driving sprocket fixed on the driven shaft, a star wheel fixedly mounted on the driven shaft, said wheel having a plurality of radial slots opening outwardly therefrom, a cam slidably mounted on the driving shaft near the wheel for rotation with said shaft, a pair of opposed pins on the cam on opposite sides of the wheel and positioned to enter the wheel slots and rotate the wheel during rotation of the cam, each movement of the wheel turning the sprocket to move a film the distance of one frame the adjacent ends of the opposed pins being spaced apart sufficiently to permit the cam to rotate without the pins thereof engaging the star wheel slots, means for selectively reciprocating the cam to move the pins alternately into wheel slots while allowing at least one pin to miss a slot during each complete reciprocation, a film shutter, means from the driving shaft for rotating the shutter to expose each film frame a plurality of times when the wheel is at rest.

2. In a moving picture projector, a driving shaft mounted for continuous rotation, a driven shaft near and parallel with the driving shaft for intermittent rotation, a film driving sprocket fixed on the driven shaft, a star wheel fixedly mounted on the driven shaft, said wheel having four equally spaced radial slots opening outwardly therefrom, a cam slidably mounted on the driving shaft near the wheel for rotation with said shaft, a pair of opposed pins spaced circumferentially 180° apart on the cam on opposite sides of the wheel to enter the wheel slots and rotate the wheel during rotation of the cam, the adjacent ends of the opposed pins being spaced apart sufficiently to permit the cam to rotate without the pins thereof engaging the star wheel slots, and means for selectively reciprocating the cam timed to move the pins alternately into the wheel slots every revolution and a half of the cam.

3. In a moving picture projector, a driving shaft mounted for continuous rotation, a driven shaft near and parallel with the driving shaft for intermittent rotation, a film driving sprocket fixed on the driven shaft, a star wheel fixedly mounted on the driven shaft, said wheel having four equally spaced radial slots opening outwardly therefrom, a cam slidably mounted on the driving shaft near the wheel for rotation with said shaft, a pair of opposed pins spaced circumferentially 180° apart on the cam on opposite sides of the wheel to enter the wheel slots and rotate the wheel during rotation of the cam, the adjacent ends of the opposed pins being spaced apart sufficiently to permit the cam to rotate without the pins thereof engaging the star wheel slots, means for selectively reciprocating the cam timed to move the pins alternately into the wheel slots every revolution and a half of the cam, a film shutter, means from the driving shaft for rotating the shutter to expose each film frame a plurality of times when the wheel is at rest.

4. In a moving picture projector, a driving shaft mounted for continuous rotation, a driven shaft near and parallel with the driving shaft for intermittent rotation, a film driving sprocket fixed on the driven shaft, a star wheel fixedly mounted on the driven shaft, said wheel having a plurality of radial slots opening outwardly therefrom, a cam slidably mounted on the driving shaft near the wheel for rotation with said shaft, a pair of opposed pins on the cam on opposite sides of the wheel and positioned to enter the wheel slots and rotate the wheel during rotation of the cam, each movement of the wheel turning the sprocket to move a film the distance of one frame, the adjacent ends of the opposed pins being spaced apart sufficiently to permit the cam to rotate without the pins thereof engaging the star wheel slots, a shutter shaft near and extending substantially at right angles to the driving shaft, a film shutter fixedly mounted on the shutter shaft, a driving connection between the driving and shutter shafts, and means operated by the driving connection and connected to the cam for selectively reciprocating the latter to move the pins alternately into wheel slots while allowing at least one pin to miss a slot during each complete reciprocation, said shutter being rotated at a speed to expose each film frame a plurality of times when the wheel is at rest.

References Cited in the file of this patent

UNITED STATES PATENTS

| | | |
|---|---|---|
| 959,119 | Davis | May 24, 1910 |
| 966,090 | Hamacek | Aug. 2, 1910 |
| 1,074,362 | Holst | Sept. 30, 1913 |
| 1,166,120 | Fox | Dec. 28, 1915 |
| 1,250,186 | Joy | Dec. 18, 1917 |
| 2,009,847 | Kelley | July 30, 1935 |
| 2,082,093 | Bedford | June 1, 1937 |
| 2,447,839 | Bingley | Aug. 24, 1948 |
| 2,589,940 | Hayek | Mar. 18, 1952 |